United States Patent [19]

Allen et al.

[11] Patent Number: 5,733,171
[45] Date of Patent: Mar. 31, 1998

[54] APPARATUS FOR THE IN-PROCESS DETECTION OF WORKPIECES IN A CMP ENVIRONMENT

[75] Inventors: Robert F. Allen, Gilbert; Paul Holzapfel, Chandler; Anthony L. Bartels, Phoenix, all of Ariz.; Warren Lin, Fremont, Calif.

[73] Assignee: Speedfam Corporation, Chandler, Ariz.

[21] Appl. No.: 683,150

[22] Filed: Jul. 18, 1996

[51] Int. Cl.$^6$ .................................................. B24B 49/04
[52] U.S. Cl. ...................... 451/5; 451/6; 451/8; 451/41
[58] Field of Search ........................... 364/474.06; 451/5, 451/6, 8, 41, 285–290

[56] References Cited

U.S. PATENT DOCUMENTS

| | | | |
|---|---|---|---|
| Re. 34,425 | 11/1993 | Schultz | 51/165.74 |
| 4,805,348 | 2/1989 | Arai et al. | 51/118 |
| 5,081,796 | 1/1992 | Schultz | 451/41 X |
| 5,099,614 | 3/1992 | Arai et al. | 51/165 |
| 5,329,732 | 7/1994 | Karlsrud et al. | 51/131.5 |
| 5,433,650 | 7/1995 | Winebarger | 451/6 |
| 5,483,568 | 1/1996 | Yano et al. | 451/6 X |
| 5,486,129 | 1/1996 | Sandhu et al. | 451/6 X |
| 5,498,196 | 3/1996 | Karlsrud et al. | 451/11 |
| 5,498,199 | 3/1996 | Karlsrud et al. | 451/289 |
| 5,605,760 | 2/1997 | Roberts | 451/41 X |
| 5,643,046 | 7/1997 | Katakabe et al. | 451/6 |
| 5,643,050 | 7/1997 | Chen | 451/41 X |

*Primary Examiner*—Timothy V. Eley
*Attorney, Agent, or Firm*—Snell & Wilmer; Michael K. Kelly

[57] ABSTRACT

An apparatus for detecting the presence of a workpiece on a polishing pad of a chemical mechanical polishing (CMP) machine employs an optical interrogation signal that is applied during the CMP process. An optical probe assembly produces a light signal that communicates with the polishing pad; portions of the light signal reflect from the polishing pad in a scattered manner. A light receptor receives reflected light associated with the interrogation signal, and the characteristics of the received light are analyzed and processed by a processor used by the apparatus. By analyzing the scattered light signals, the apparatus distinguishes the reflective characteristics of the polishing pad from the reflective characteristics of the workpiece. Thus, the apparatus is capable of detecting a lost or broken workpiece in a fast and effective manner.

16 Claims, 5 Drawing Sheets

APPARATUS FOR THE IN-PROCESS DETECTION OF WORKPIECES IN A CMP ENVIRONMENT

TECHNICAL FIELD

The present invention relates, generally, to methods and apparatus for detecting whether a semiconductor wafer breaks or otherwise becomes dislodged from a carrier during a CMP process, and more particularly to an improved technique for detecting the in-situ, in-process loss of a wafer using reflective optics.

BACKGROUND ART AND TECHNICAL PROBLEMS

The production of integrated circuits begins with the creation of high-quality semiconductor wafers. During the wafer fabrication process, the wafers may undergo multiple masking, etching, and dielectric and conductor deposition processes. Because of the high-precision required in the production of these integrated circuits, an extremely flat surface is generally needed on at least one side of the semiconductor wafer to ensure proper accuracy and performance of the microelectronic structures being created on the wafer surface. As the size of the integrated circuits continues to decrease and the number of microstructures per integrated circuits increases, the need for precise wafer surfaces become more important. Therefore, between each processing step, it is usually necessary to polish or planarize the surface of the wafer to obtain the flattest surface possible.

For a discussion of chemical mechanical planarization (CMP) process and apparatus, see, for example, Arai, et al., U.S. Pat. No. 4,805,348, issued February 1989; Arai, et al., U.S. Pat. No. 5,099,614, issued March 1992; Karlsrud, et al, U.S. Pat. No. 5,329,732, issued July 1994; Karlsrud et al, U.S. Pat. No. 5,498,196, issued March 1996; and Karlsrud, et al, U.S. Pat. No. 5,498,199, issued March 1996.

Such polishing is well known in the art and generally includes attaching one side of the wafer to a flat surface of a wafer carrier or chuck and pressing the other side of the wafer against a flat polishing surface. In general, the polishing surface comprises a polishing pad that has an exposed abrasive surface of, for example, cerium oxide, aluminum oxide, fumed/precipitated silica or other particulate abrasives. Polishing pads can be formed of various materials, as is known in the art, and which is available commercially. Typically, the polishing pad may be a blown polyurethane, such as the IC and GS series of polishing pads available from Rodel Products Corporation in Scottsdale, Ariz. The hardness and density of the polishing pad depends on the material that is to be polished.

During the polishing or planarization process, the workpiece or wafer is typically pressed against the polishing pad surface while the pad rotates about its vertical axis. In addition, to improve the polishing effectiveness, the wafer may also be rotated about its vertical axis and oscillated back and forth over the surface of the polishing pad. It is well known that polishing pads tend to wear unevenly during the polishing operation, causing surface irregularities to develop on the pad. To ensure consistent and accurate planarization and polishing of all workpieces, these irregularities must be removed.

During the CMP process, workpieces occasionally become dislodged from the workpiece carrier, or they may break during polishing. If a dislodged workpiece or a part of a broken workpiece is allowed to remain on the polishing table, it could contact other workpieces and/or workpiece carriers on the same polishing table and thereby damage or destroy all of the workpieces on the table. Accordingly, it is desirable to detect the presence of a broken or dislodged workpiece immediately and to terminate processing until the situation can be rectified. Typically, this requires a thorough cleaning and/or replacement of the polishing pad, so that workpiece fragments and other debris can be removed so that they do not damage other intact workpieces.

Presently known systems for detecting the loss of workpieces or for detecting broken workpieces are unsatisfactory in several regards. For example, currently known techniques apply a substantially monochromatic light beam, such as, for example, a red LED light source, to the polishing pad surface and a photodetector detects a portion of the applied signal which is reflected from the polishing pad. It is known that the wavelength of light reflected from the polishing pad differs from the wavelength of light reflected from a disk which may pass through the applied monochromatic beam. In accordance with presently known systems, if the wavelength of reflected light changes dramatically, it is presumed that a stray (i.e., lost, dislodged workpiece or workpiece fragment) is detected, and the CMP machine is immediately shut down to prevent further damage to other workpieces on the same table. However, because prior art techniques employ a limited bandwidth light source, such as LEDs, the presence of slurry, deionized water and iodine on the pad and on the wafer itself tend to mask the limited bandwidth light, preventing the light from being properly reflected back to the photodetector. Consequently, many presently known workpiece detection schemes often emit "false" readings whereupon machines are shut down and processing halted even though all disks remain intact within their respective carriers. Similarly, presently known machines often fail to detect a dislodged workpiece if the band of acceptable wavelengths indicative of the polishing pad is broad enough to include the light reflected by a slurry covered workpiece.

A technique for detecting lost or dislodged workpieces on a CMP polishing pad is thus needed which overcomes the shortcomings of the prior art.

SUMMARY OF THE INVENTION

In accordance with the present invention, methods and apparatus are provided which overcome many of the shortcomings of the prior art.

In accordance with the preferred embodiment, a probe is suitably mounted proximate the upper surface of a CMP polishing table, such that the probe projects a columnated beam of broad band light at the polishing table surface.

In accordance with a further aspect of the present invention, the probe further includes a receptor for detecting a portion of the broad band signal which is reflected from the polishing table. The signal receptor is configured to apply the reflected signal to a single element photodiode which converts the light signal into an analog electrical signal.

In accordance with a further aspect of the present invention, the output of the photodiode is applied to an analog digital converter and then to a controller which embodies an algorithm for processing the output of the photodiode.

In accordance with yet a further aspect of the present invention, the output of the photodiode may be processed to more accurately determine whether a wafer or wafer fragment is present on the polishing pad.

In accordance with yet a further aspect of the present invention, if a dislodged or fragmented wafer is detected on the polishing pad a controller will send a signal to a CMP machine controller, immediately stopping processing of the CMP machine.

DETAILED DESCRIPTION OF PREFERRED EXEMPLARY EMBODIMENT

The subject invention relates to the in-process detection of a dislodged or fractured workpiece on a polishing pad using a broad spectrum light source, a photospectrometer, and a controller including a smart algorithm for analyzing the output of the photospectrometer to determine if a workpiece is on the pad. The preferred embodiment set forth herein relates to the detection of semiconductor wafers on a CMP polishing pad; it will be appreciated, however, that the principles of the present invention may be employed to detect workpieces in a variety of polishing or planarization environments, such as, for example, hard disks, and the like.

Figure 1:
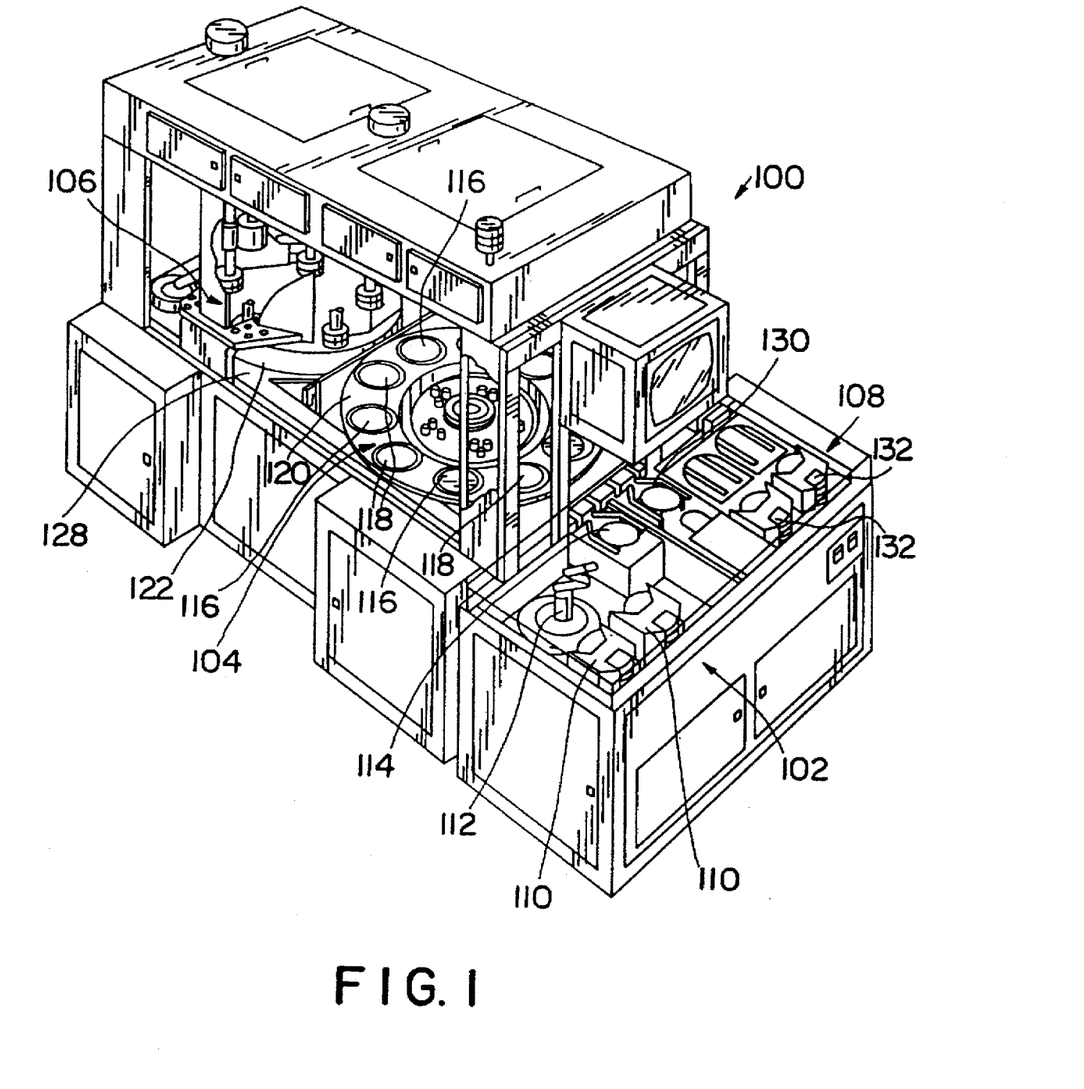
FIG. 1 is a perspective view of an exemplary CMP machine useful in the context of the present invention.
Figure 2:
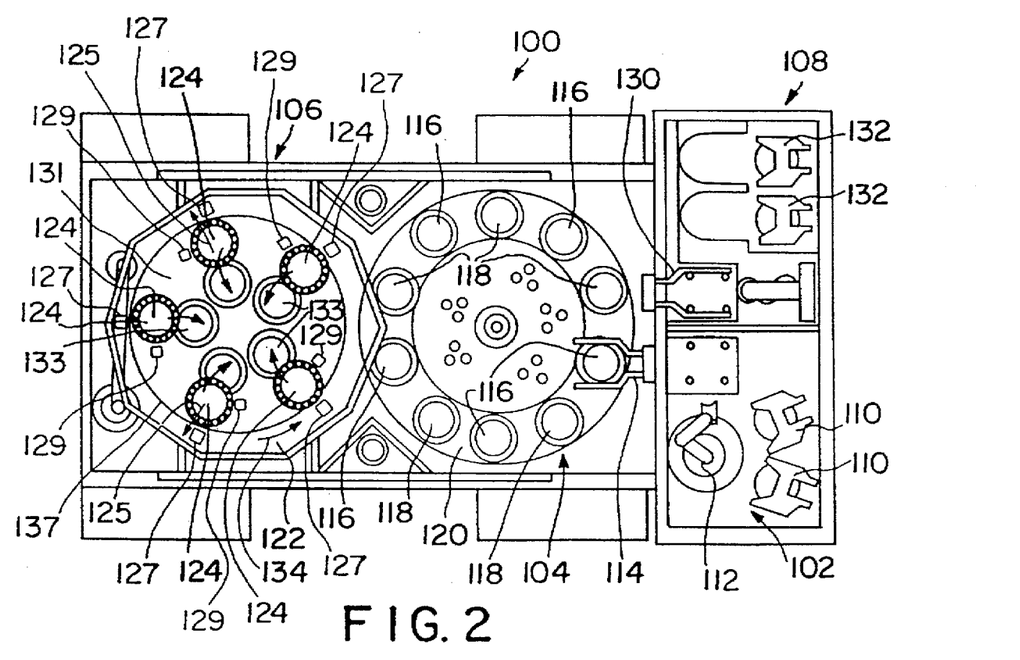
FIG. 2 is a top view of the CMP machine of FIG. 1, showing an exemplary orientation of a probe assembly in accordance with the present invention.

Referring now to FIGS. 1–2, a wafer polishing apparatus 100 is shown embodying the present invention. Wafer polishing apparatus 100 suitably comprises a comprehensive wafer polishing machine which accepts wafers from a previous processing step, polishes and rinses the wafers, and reloads the wafers back into wafer cassettes for subsequent processing.

Discussing now the polishing apparatus 100 in more detail, apparatus 100 comprises an unload station 102, a wafer transition station 104, a polishing station 106, and a wafer rinse and load station 108.

In accordance with a preferred embodiment of the present invention, cassettes 110, each holding a plurality of wafers, are loaded into the machine at unload station 102. Next, a robotic wafer carrier arm 112 removes the wafers from cassettes 110 and places them, one at a time, on a first wafer transfer arm 114. Wafer transfer arm 114 then lifts and moves the wafer into wafer transition section 104. That is, transfer arm 114 suitably places an individual wafer on one of a plurality of wafer pick-up stations 116 which reside on a rotatable table 120 within wafer transition section 104. Rotatable table 120 also suitably includes a plurality of wafer drop-off stations 118 which alternate with pick-up stations 116. After a wafer is deposited on one of the plurality of pick-up stations 116, table 120 will rotate so that a new station 116 aligns with transfer arm 114. Transfer arm 114 then places the next wafer on the new empty pick-up station 116. This process continues until all pick-up stations 116 are filled with wafers. In the preferred embodiment of the invention, table 120 will include five pick-up stations 116 and five drop-off stations 118.

Next, a wafer carrier apparatus 122, comprising individual wafer carrier elements 124, suitably aligns itself over table 120 so that respective carrier elements 124 are positioned directly above the wafers which reside in respective pick-up stations 116. The carrier apparatus 122 then drops down and picks up the wafers from their respective stations and moves the wafers laterally such that the wafers are positioned above polishing station 106. Once above polishing station 106, carrier apparatus 122 suitably lowers the wafers, which are held by individual elements 124, into operative engagement with a polishing pad 126 which sits atop a lap wheel 128. During operation, lap wheel 128 causes polishing pad 126 to rotate about its vertical axis, for example, in a counter-clockwise direction as shown by arrow 134. At the same time, individual carrier elements 124 spin the wafers about their respective vertical axes and oscillate the wafers back and forth across pad 126 (substantially along arrow 133) as they press against the polishing pad. In this manner, the surface of the wafer will be polished or planarized.

After an appropriate period of time, the wafers are removed from polishing pad 126, and carrier apparatus 122 transports the wafers back to transition station 104. Carrier apparatus 122 then lowers individual carrier elements 124 and deposits the wafers onto drop-off stations 118. The wafers are then removed from drop-off stations 118 by a second transfer arm 130. Transfer arm 130 suitably lifts each wafer out of transition station 104 and transfers them into wafer rinse and load station 108. In the load station 108, transfer arm 130 holds the wafers while they are rinsed. After a thorough rinsing, the wafers are reloaded into cassettes 132, which then transports the wafers to subsequent stations for further processing or packaging.

Although CMP machine 100 is shown having five polishing stations, it will be appreciated that the present invention may be employed in the context of virtually any number of polishing stations. Moreover, the present invention may also be employed in circumstances where not all of the polishing stations are functioning at a time. For example, many standard wafer cassettes carry twenty-four individual workpieces in a single cassette. Consequently, because there are often five workpiece chucks on a single CMP machine, often times the last four disks within a cassette are polished at one time, leaving the fifth disk-holder empty.

With continued reference to FIG. 2, a probe assembly 129 is suitably configured on wafer carrier apparatus 122 near each carrier element 124. In accordance with a particularly preferred embodiment of the invention, a respective probe assembly 129 is suitably configured to optically engage at least a portion of the polishing pad surface adjacent each carrier element 124 to detect the presence of a wafer or wafer fragment on the polishing pad surface as described in greater detail below in conjunction with FIG. 3.

In accordance with a further aspect of the invention, apparatus 100 may suitably comprise a probe 127 configured to measure surface characteristics of wafers being polished by CMP apparatus 100. A detailed description of an analagous probe configuration is disclosed in U.S. patent application Ser. No. 08/687,710, filed Jul. 26, 1996, and entitled Methods and Apparatus for the In-Process Measurement of Thin Film Layers.

Figure 3:
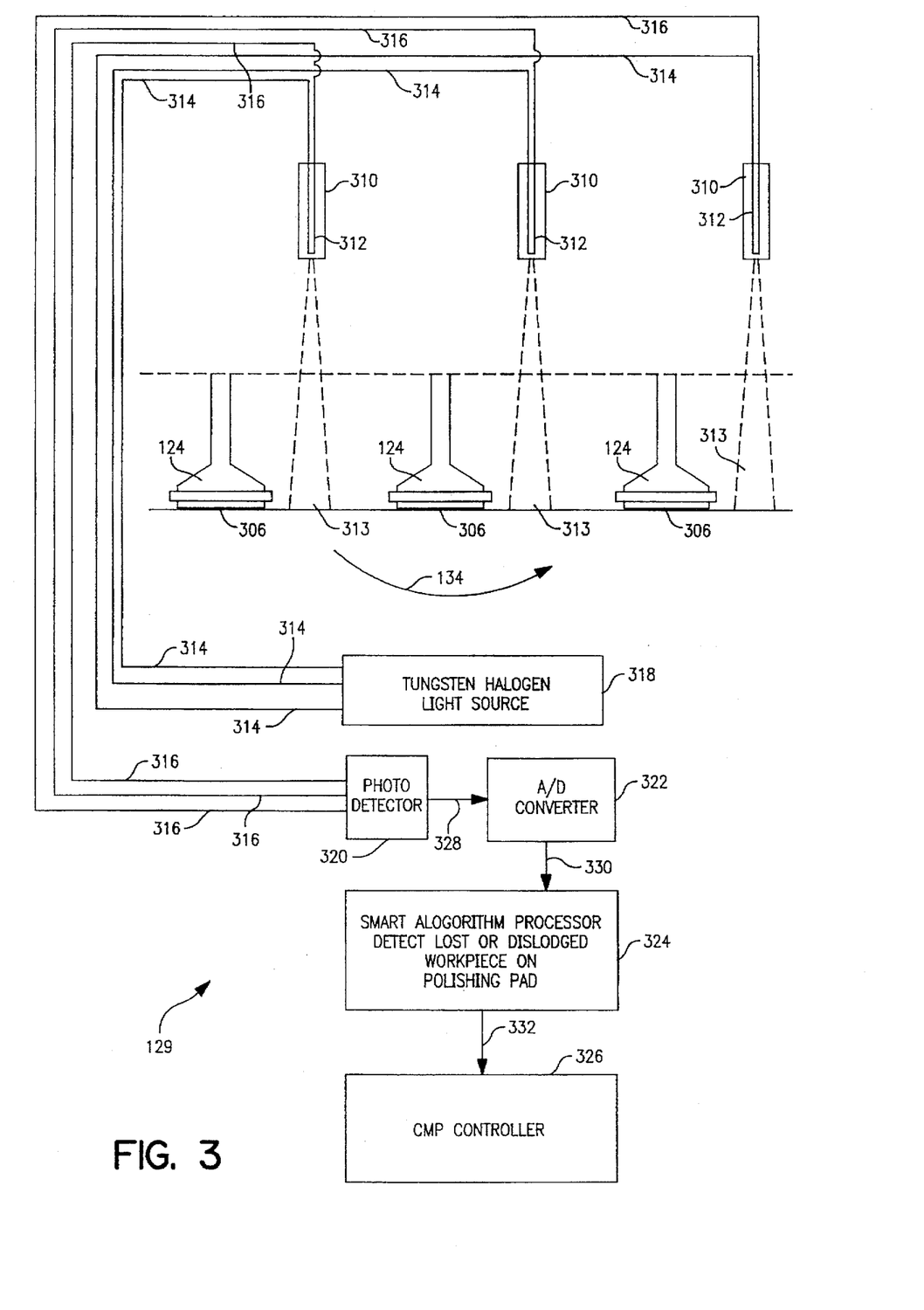
FIG. 3 is a schematic view of a probe assembly shown applying light signal to a polishing pad and capturing a reflective signal therefrom, and further including various processing components for detecting the loss of a wafer based on the reflected signal.

Referring now to FIG. 3, an exemplary probe assembly 129 in accordance with the present invention suitably comprises a housing 310 having a bifurcated fiber probe 312, a light source 318, a photodetector 320, an analog to digital (A/D) converter 322, a processor 324 and a CMP controller 326.

As best seen in FIG. 3, exemplary workpieces 306 are shown being held by carrier elements 124 and polished by polishing table 126 as described above in conjunction with FIGS. 1 and 2. For clarity, the other components of apparatus 100 are omitted from FIG. 3. Probe assembly 129 is suitably mounted proximate to, and suitably above polishing table 128 (and hence polishing pad 126, such that housing 310 and probe 312 are suitably directed at the top surface of polishing pad 126. In particular, probe 312 may be mounted under the multi-head transport assembly (MHTA) which is part of carrier apparatus 122 in an area that will suitably allow the probe to have a field of view which encompasses only a desired portion of the polishing pad.

In accordance with the illustrated embodiment, housing 310 with probe 312 is suitably mounted above and adjacent to each carrier element 124 so that a field of view 313 of each probe 312 is directly in front of the carrier element. That is, if table 128 and pad 126 are rotating counterclockwise, as shown by arrow 134 (See also FIG. 2), probe 312 is configured such that a wafer (or wafer fragment) will enter field of view 313 immediately upon becoming dislodged from the carrier. In this manner, probe assembly 129 will detect a dislodged wafer or wafer fragment as soon as possible and will stop the machine before other wafers can be damaged. Similarly, if table 128 and pad 126 are rotating clockwise, probe 312 will be configured so that field of view 313 is directed to the opposite side of each carrier element 124.

In accordance with an alternate embodiment of the present invention, housing 310 and probe 312 may be angled so that field of view 313 is not substantially perpendicular with pad 126. As discussed below in more detail, housing 310 and probe 312 may advantageously be angled with respect to the pad to achieve optimum readings.

In accordance with a particularly preferred embodiment of the present invention, and with continued reference to FIG. 3, probe 312 suitably comprises a transmitter cable 314 through which light is transmitted from light source 318 to probe 312 and onto the top surface of polishing pad 126. Similarly, probe 312 further comprises a receptor cable 316 through which light reflected from the polishing pad and surface is transmitted to photodetector 320. Photodetector 320 receives the reflected light energy and converts it into an analog electrical signal 328 which in turn is converted to a digital signal 330 at A/D converter 322. Processor 324 receives digital signal 330 from converter 322 and analyzes it according to an algorithm (discussed below) to determine if the signal is indicative of wafer or wafer fragments being present on the polishing pad. If a wafer or wafer fragment is detected, processor 324 sends a signal 332 to CMP controller 326 which, in turn, immediately shuts down the machine. It will be appreciated that the top surface of the polishing pad may be sampled by probe assembly 129 at any desired rate or the sampling may be substantially continuous.

In accordance with a further aspect of the present invention, light source 318 suitably comprises any source capable of applying the desired light signal to the surface of the pad. For example, a tungsten halogen light source capable of emitting a broad band light signal, for example in the range of 350 to 2,000 nm, and most preferably in the range of 400 to 850 nm. A suitable halogen light source may comprise a model number L73A98, available from Gilway Corporation of Massachusetts.

Although cables 314 and 316 suitably comprise fiber optic cables in the preferred embodiment, virtually any conductor may be employed which satisfactorily delivers an interrogation signal (e.g. a light signal) to the workpiece and captures at least a portion of the signal reflected by the workpiece. Similarly, photodetector 320 and A/D converter 322 may suitably comprise virtually any photodetector and A/D converter currently available. In the preferred embodiment, photodetector suitably comprises a model number S2386, available from the Hamamatsu Corporation of Japan. Similarly, in the preferred embodiment, A/D converter suitably comprises a 16 channel, 12 bit, 330 kHz converter configured as a PCMCIA interface with processor 324, such as, for example, model number PCMCIA-16DAS, available from the Mission Peak Optics Company of Freemont, Calif.

Processor 324 suitably comprises any general purpose controller capable of receiving an output signal 330 from converter 322 and calculating various parameters from signal 326. In the preferred embodiment, controller 324 is suitably configured to interpret signal 330 and thereby determine, based on a predetermined algorithm, if a wafer or wafer fragment is present on polishing pad 126. The algorithm is suitably configured to distinguish between the reflective characteristics of the polishing pad and the workpiece being polished, regardless of the type of polishing pad used or the style of workpiece being polished. Thus, even with the presence of large amounts of slurry and/or deionized water, the processor will be able to detect the presence of a wafer or wafer fragment on the pad. In a particularly preferred embodiment, controller 324 suitably comprises any general purpose personal computer.

Controller 324 is also suitably configured to output a signal 332 to a CMP controller 326. In the preferred embodiment, signal 332 is a binary signal indicating the presence or absence of a workpiece on the polishing pad. It will be understood, however, that signal 332 may embody any suitable information or characteristics about the polishing pad surface 126 necessary to convey the proper information to the CMP controller 326.

In accordance with the preferred embodiment, if signal 332 indicates that a wafer or a portion of a wafer has become dislodged from a carrier 124, CMP controller 326 will quickly shut down the motors on the system, stopping processing and ensuring that the other wafers being polished, and the CMP machine itself, are minimally damaged. In a particularly preferred embodiment of the invention, controller 326 may comprise a separate control device connected to the CMP machines main processor/controller, or controller 326 may be configured as part of the main unit. Further, controller 326 may be configured as part of processor 324. As will be appreciated by one skilled in the art, controller 326 comprises any type and configuration of controller capable of shutting down the CMP machine.

The operation and configuration of probe assembly 129, and in particular an exemplary method (algorithm) of interpreting the optical signal from probe 312 will now be described in conjunction with FIGS. 4–7.

As briefly discussed above, different types of polishing pads exhibit different reflective characteristics. In particular, CMP polishing apparatus 100 which is discussed in more detail above, may utilize at least two different kinds of pads: a primary polishing pad which generally exhibits a substantially light or white color; and a secondary polishing pad which generally exhibits a much darker color. Because of the difference in pad colors and configurations, the angular placement of probe 312 may vary for each pad. Accordingly, it may be preferable to employ two or more probes on apparatus 100 for each carrier element 124, e.g. one for each different type of pad used. Alternatively, apparatus 100 may include only one probe for each carrier element, such that when the polishing pads are changed, the angular alignment of the probe is also changed accordingly.

Figure 4:
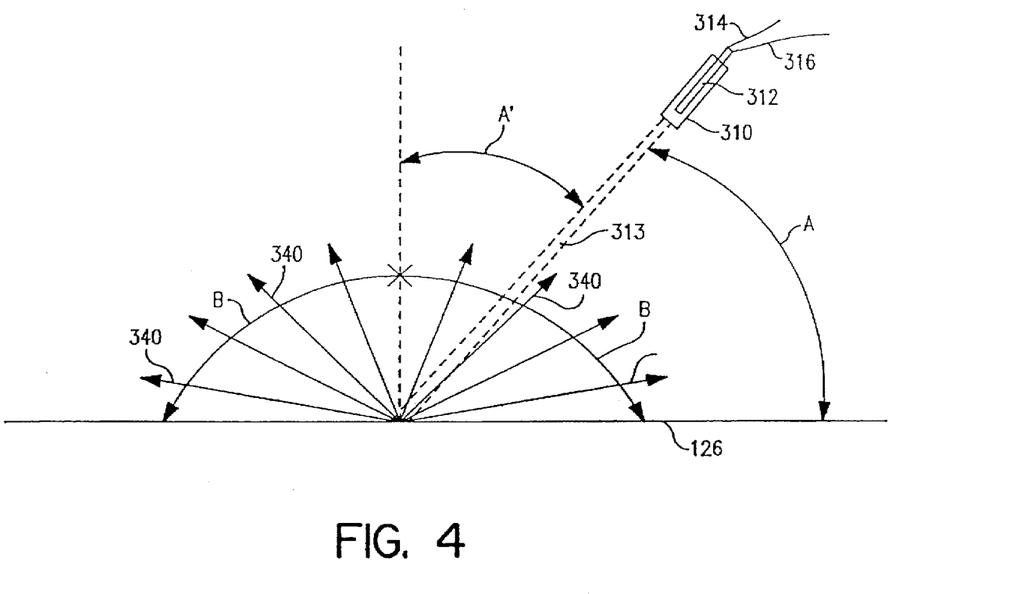
FIG. 4 is a schematic view of the configuration of the probe assembly of FIG. 3 directed at a light-colored primary polishing pad.
Figure 5:
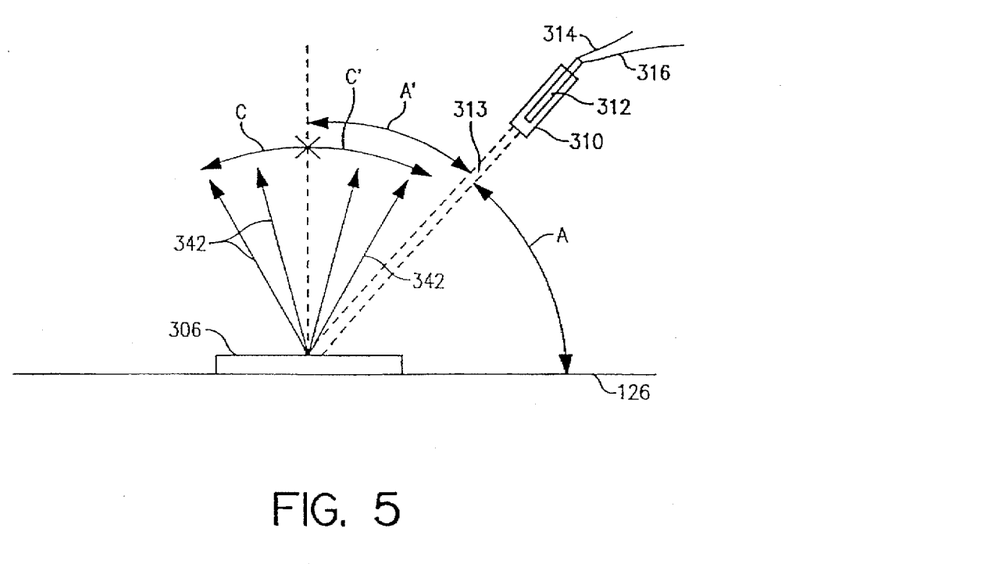
FIG. 5 is a schematic view of the probe configuration of FIG. 4 with a wafer in the field of view of the probe.

Referring now to FIGS. 4 and 5, the configuration of housing 310 and probe 312 will now be discussed for the primary, light-colored pad. In accordance with the preferred embodiment, housing 310 and probe 312 are suitably disposed at an angle of about 30° to about 60° and preferably about 45° with respect to polishing pad 126. This angle is illustrated as angle A in FIGS. 4 and 5. Similarly, probe 312 is also suitably disposed about 30° to about 60° and preferably about 45° from the vertical axis of pad 126. This is shown in FIGS. 4 and 5 as angle A'.

During operation, probe 312 suitably projects a white light down onto polishing pad 126 near carrier element 124 (not shown in FIGS. 4 and 5). Given the characteristics of the primary, light-colored pad, reflected light 340 will be reflected from the pad in substantially all directions as shown by arrows 340 in FIG. 4. In this manner, the receptor sensor of probe 312 will receive some of the reflected light. As a consequence of the pressure of the slurry, deionized water flow ripple, air bubbling, carrier agitation and long-term discoloration of the pad, the energy received by probe 312 is generally about 50% to about 75% of the light energy which would otherwise be received absent these factors. As the pad becomes more discolored, the amount of received light will decrease. Using a light-colored pad, the amount of light received probably will not be reduced by more than 50%

Referring now to FIG. 5, if a wafer or wafer fragment becomes dislodged from a carrier element, at least a portion of the white light radiated from probe 312 will contact the wafer or wafer fragment, as opposed to the polishing pad. In accordance with this aspect of the invention, because of the distinct reflective properties of the wafer, the light energy will be reflected upwards from the wafer in a more condensed pattern as shown in FIG. 5 as light rays 342 substantially defining a cone C-C'. In accordance with this aspect of the invention, cone C-C' is at an angle from the vertical of about 20°-40°, and preferably about 30° from the perpendicular to wafer 306. Therefore, because probe 312 is oriented at an angle of about 45° from perpendicular (angle A'), the probe will not appreciably detect the light reflected from the wafer. When the processor 324 receives a signal indicating that the light reflected by the wafer is not received by the probe, the processor determines that a wafer or wafer fragment was detected and thus sends a signal to CMP controller 326 to shut off the machine.

Figure 6:
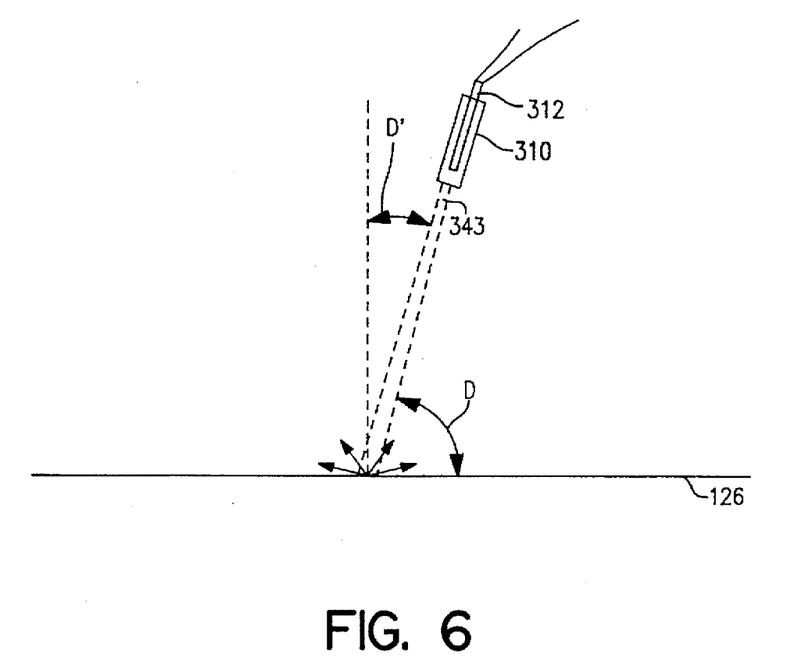
FIG. 6 is a schematic view of the configuration of the probe assembly of FIG. 3 directed at a darker-colored secondary polishing pad.
Figure 7:
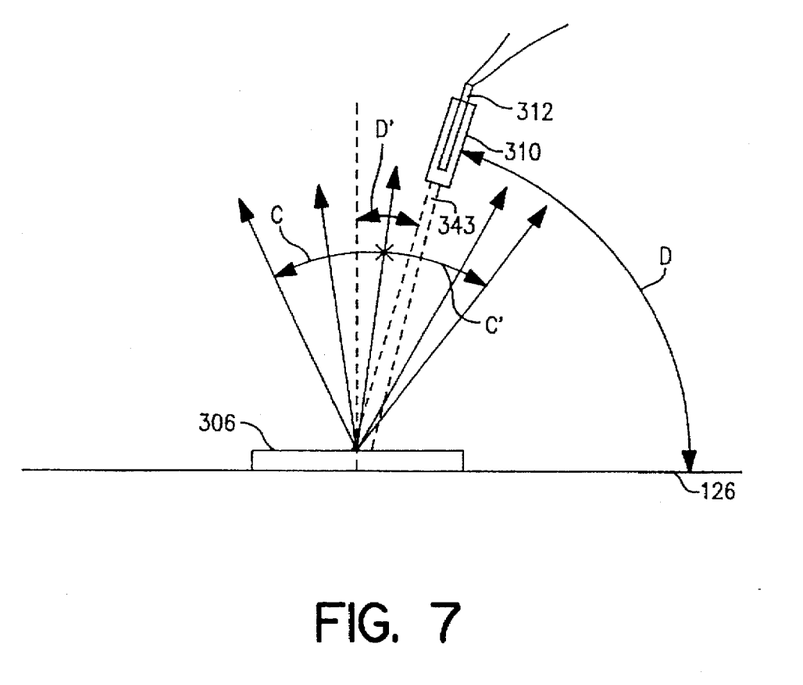
FIG. 7 is a schematic view of the probe assembly of FIG. 6 with a wafer in the field of view of the probe.

Referring now to FIGS. 6 and 7, the scattering characteristics of the secondary, darker pad will now be discussed. In accordance with this embodiment of the invention, housing 310 and probe 312 are angularly oriented at about 80°-90° and preferably about 85° from the plane of the pad (angle D), or about 0°-10° and preferably about 5° from perpendicular to the pad (angle D'). In accordance with this aspect of the invention, white light 313 is directed to the surface of pad 126 near carrier element 124 (not shown in FIGS. 5 and 6). Because of the dark coloration of the secondary pad, most of the light energy is absorbed so that probe 312 will detect little if any scattering. Further, by orienting the probe at an angle of about 5°, the light reflected by the slurry and deionized water will be outside the field of view of the probe, thus ensuring that the probe detects little or no scattering.

Referring now to FIG. 7, if a wafer or wafer fragment comes within the field of view of light 313, the light will be reflected back up in an area of about ±30° from perpendicular to the wafer (cone C -C')as discussed above. Accordingly, because probe 312 is now angularly oriented at about only 5° from perpendicular, it will receive the scattered light from the wafer. Thus, if processor 324 receives a signal indicating the presence of reflected light, the processor will determine that a wafer is present and send a signal to CMP controller 326 to stop the machine.

It should be noted that the reflective characteristics of the light and dark polishing pads are likely to differ from each other; therefore, as different types of pads are used, the angular orientation of housing 310 and probe 312 may be adjusted accordingly.

Although the subject invention is described herein in conjunction with the appended drawing figures, it will be appreciated that the invention is not limited to the specific form shown. Various modifications in the selection and arrangement of parts, components, and processing steps may be made in the implementation of the invention. For example, although a preferred embodiment is set forth in which a tungsten halogen light source is used in connection with fiber optic conductors, it will be appreciated that virtually any interrogation signal may be employed through appropriate conductors, such that in-process, in-situ monitoring of polishing pads is possible. Moreover, although the light source, photodiode photospectrum meter, controller, and CMP controller are illustrated in FIG. 3 in schematic form, it will be appreciated that only the probe 312 need be disposed proximate the workpieces and polishing pad; the controllers and other components may be disposed remotely from the workpiece as desired. These and other modifications may be made in the design and arrangement of the various components which implement the invention without departing from the spirit and the scope of the invention as set forth in the appended claims.

We claim:

1. An apparatus for detecting the presence of a workpiece on a polishing pad during a chemical mechanical polishing (CMP) procedure, said apparatus comprising:

a probe assembly disposed proximate a polishing pad associated with a CMP machine, such that said probe assembly establishes intermittent optical communication with a surface of said polishing pad as at least one workpiece is processed on said polishing pad;

a light source configured to direct an input light signal at an area on said surface;

a receptor configured to capture a portion of a scattered light response associated with said input signal; and a processor configured to process said portion of said scattered light response and generate an output indicative of the presence or absence of a workpiece within said area on said surface.

2. The apparatus of claim 1, wherein said input light signal comprises a white light signal.

3. The apparatus of claim 1, wherein said processor comprises a photodetector for converting said portion of said scattered light response into an analog electrical signal.

4. The apparatus of claim 3, wherein said processor further comprises an analog to digital converter for converting said analog electrical signal to a digital signal.

5. The apparatus of claim 4, wherein said processor further comprises a controller for analyzing said digital signal from said analog to digital converter to determine the absence or presence of a workpiece within said area on said surface.

6. The apparatus of claim 1, wherein said processor is further configured to generate said output in a manner independent of the reflective characteristics of a slurry present on said polishing pad.

7. The apparatus of claim 1, wherein said polishing pad is a light colored polishing pad.

8. The apparatus of claim 7, wherein said light source and said receptor are directed at said polishing pad at an angle of about 45° from said polishing pad.

9. The apparatus of claim 1, wherein said polishing pad is a dark colored polishing pad.

10. The apparatus of claim 9, wherein said light source and said receptor are directed at said polishing pad at an angle of about 85° from said polishing pad to eliminate a wet surface effect.

11. The apparatus of claim 1, wherein said processor is configured to generate an output indicative of the presence or absence of a dislodged, broken, or misaligned workpiece within said area on said surface.

12. The apparatus of claim 1, wherein:
   said processor is configured to generate a first output indicative of the presence of a workpiece within said area on said surface; and
   said processor is configured to generate a second output indicative of the absence of a workpiece within said area on said surface.

13. The apparatus of claim 1, wherein said input light signal has a wavelength within the range of approximately 350 nanometers to approximately 2000 nanometers.

14. The apparatus of claim 1, wherein said area on said surface is adjacent to and separated from a workpiece carrier associated with said CMP system.

15. An apparatus for detecting the presence of workpieces on a polishing pad during a chemical mechanical polishing (CMP) procedure, said apparatus comprising:
   a probe assembly disposed proximate a polishing pad associated with a CMP system such that said probe assembly establishes intermittent optical communication with said polishing pad as at least one workpiece is processed on said polishing pad;
   a tungsten halogen light source configured to direct an input light signal at a surface of said polishing pad;
   a receptor configured to capture a portion of a scattered light response associated with said input signal; and
   a processor configured to process said portion of said scattered light response and to generate an output indicative of the presence of a dislodged, broken, or misaligned workpiece on said polishing pad.

16. An apparatus for detecting the presence of workpieces on a polishing pad during a chemical mechanical polishing (CMP) procedure, said apparatus comprising:
   a probe assembly disposed proximate a polishing pad associated with a CMP system such that said probe assembly establishes intermittent optical communication with said polishing pad as at least one workpiece is processed on said polishing pad;
   a light source configured to direct an input light signal at a surface of said polishing pad;
   a receptor configured to capture a portion of a scattered light response associated with said input signal;
   a processor configured to process said portion of said scattered light response and to generate an output indicative of the presence of a dislodged, broken, or misaligned workpiece on said polishing pad; and
   a CMP controller operatively connected to said processor, wherein said CMP controller causes said CMP system to stop processing in response to said output.

* * * * *